(No Model.) 3 Sheets—Sheet 3.
A. H. WAGNER.
Steam Engine for Traction Vehicles.
No. 234,824. Patented Nov. 23, 1880.
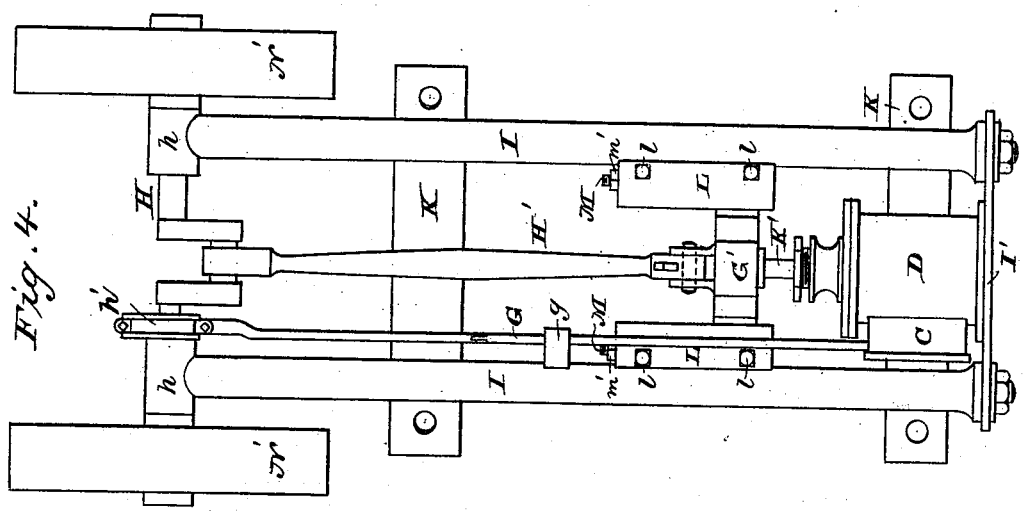
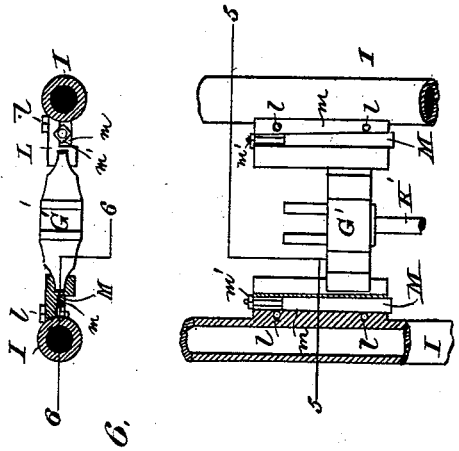
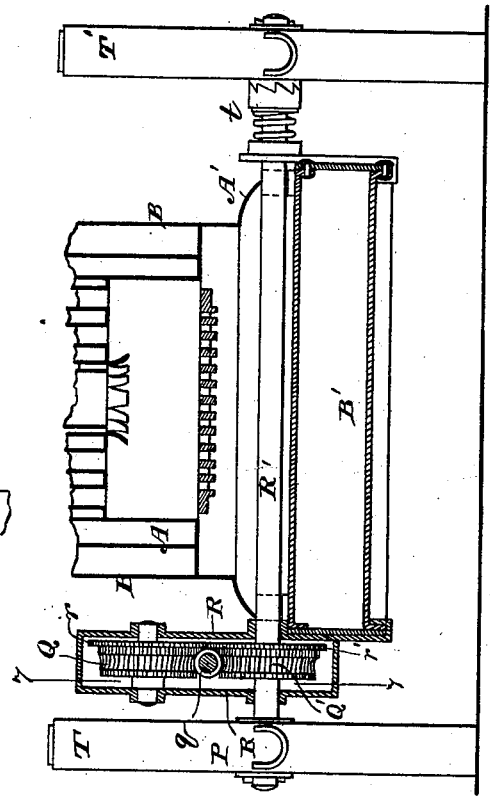
WITNESSES
Wm A. Skinkle
Chas. H. Baker
INVENTOR
Ausbert H. Wagner
By his Attorneys
Baldwin, Hopkins & Peyton

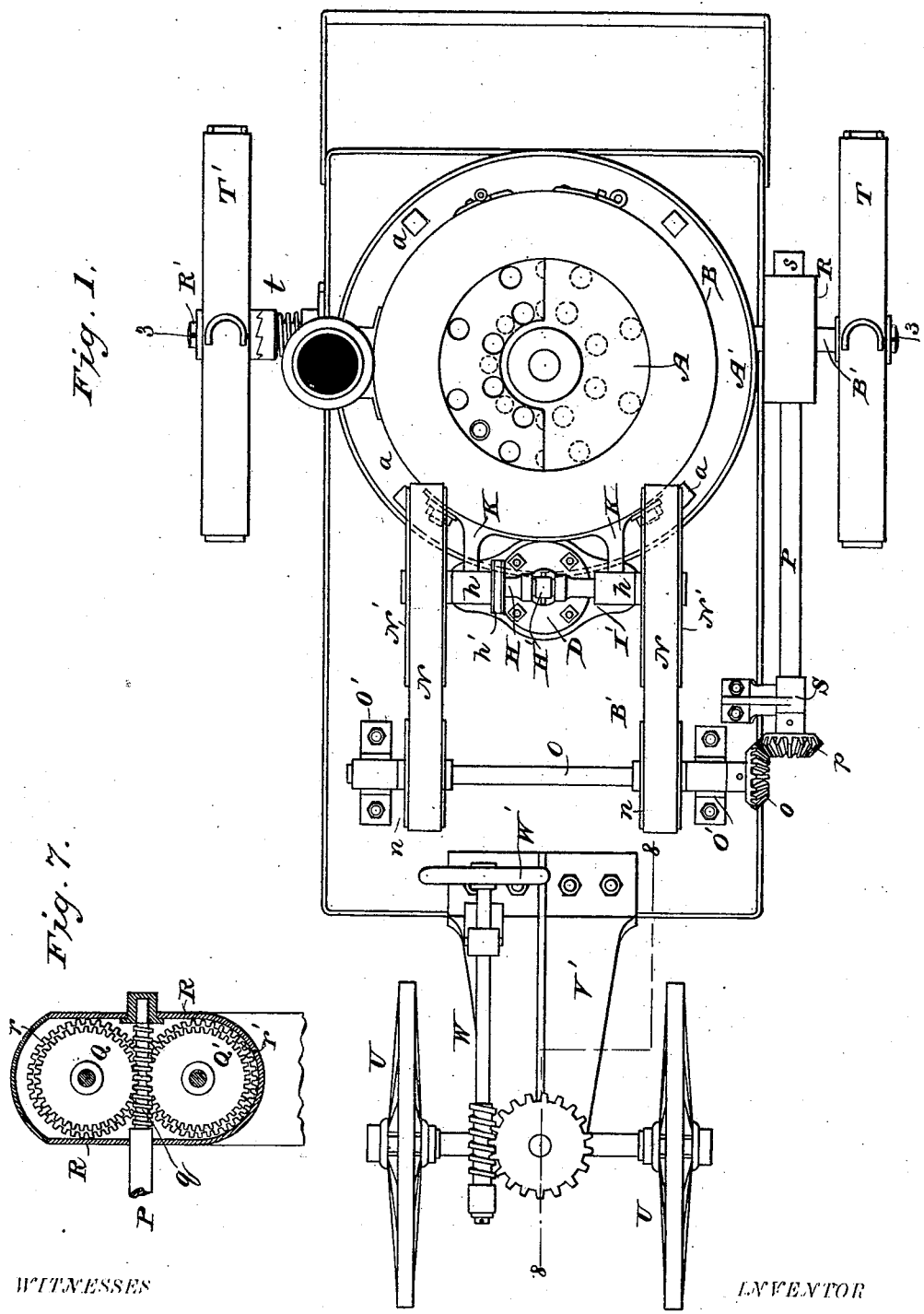

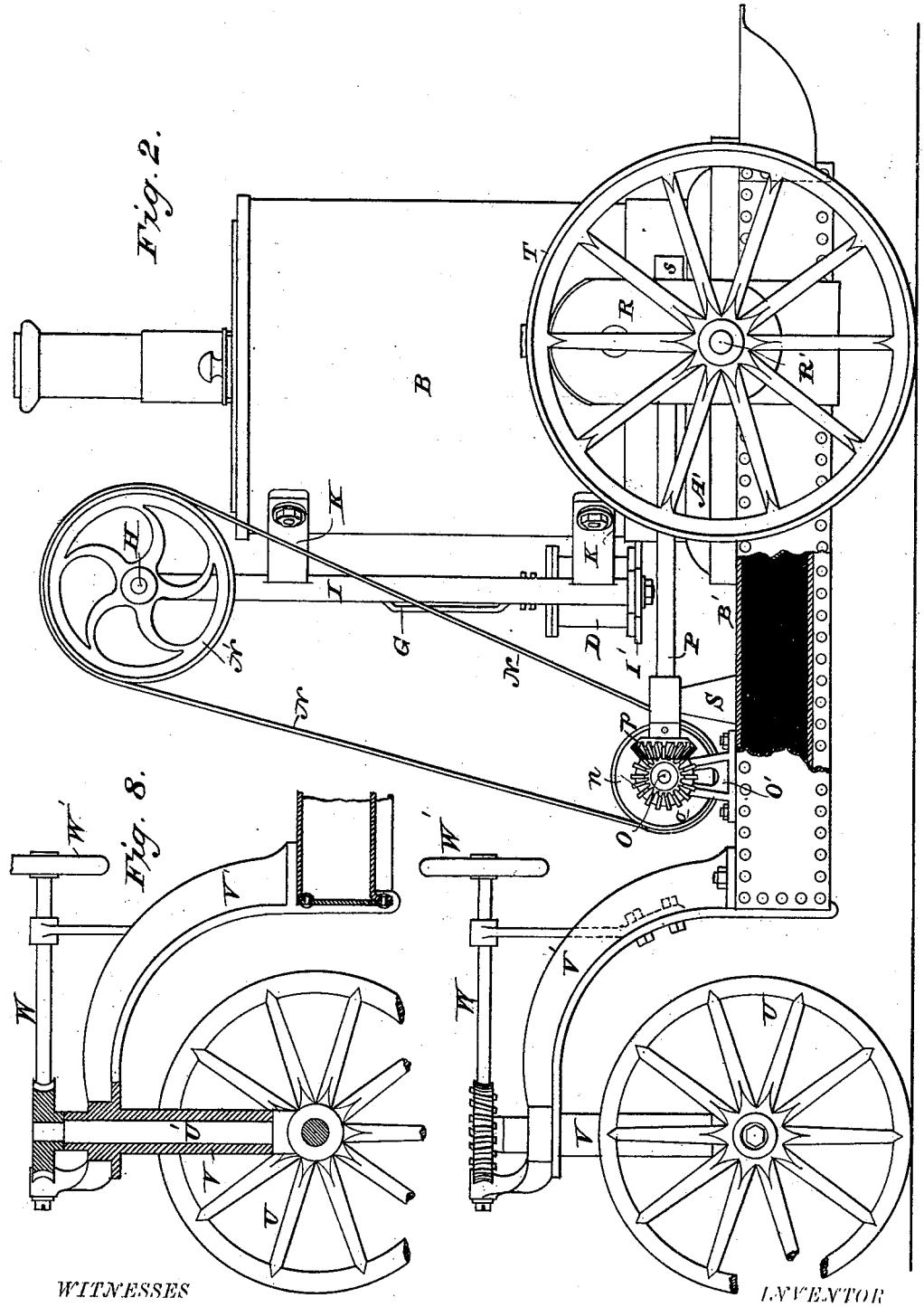

UNITED STATES PATENT OFFICE.

AUSBERT H. WAGNER, OF CHICAGO, ILLINOIS, ASSIGNOR TO ANNA G. WAGNER, OF SAME PLACE.

STEAM-ENGINE FOR TRACTION-VEHICLES.

SPECIFICATION forming part of Letters Patent No. 234,824, dated November 23, 1880.

Application filed October 6, 1880. (No model.)

*To all whom it may concern:*

Be it known that I, AUSBERT H. WAGNER, of Chicago, in the county of Cook and State of Illinois, have invented certain new and useful Improvements in Steam-Engines and in Traction-Vehicles operated thereby, of which the following is a specification.

My invention mainly relates to improvements in light or portable steam-engines of the class adapted for operation in connection with upright boilers to propel traction-vehicles, drive thrashing-machines, &c.

My invention involves improvements in various parts of the mechanism hereinafter first fully described preparatory to specific designation of the subject-matter claimed.

In the accompanying drawings my present improvements are represented in connection with parts of a suitable boiler and its adjuncts, constituting the subject-matter of another application filed by me on or about the 8th day of September, 1880, and to which no claim is herein made.

Figure 1 is a plan or top view. Fig. 2 is a side elevation, with the water-tank body of the vehicle partly broken away. Fig. 3 is a view, partly in rear elevation and partly in transverse vertical section, on the line 3 3 of Fig. 1. Fig. 4 is a front elevation, showing the cylinder, crank-shaft, supporting-columns, &c. Figs. 5 and 6 are views, in detail, illustrating features of construction not fully represented by Fig. 4, Fig. 5 being a section on the line 5 5 of Fig. 6, and Fig. 6 being a rear elevation, partly in section, on the line 6 6 of Fig. 6. Fig. 7 is a longitudinal vertical section on the line 7 7 of Fig. 3. Fig. 8 is a view, partly in side elevation and partly in longitudinal vertical section, on the line 8 8 of Fig. 1.

The boiler A is supported and inclosed in a shell or casing, B, which provides a hot-air space or jacket-chamber. The flanged base A' of this casing serves to detachably secure it in place by screw-bolts $a$. In this instance four such bolts are used to removably attach the shell to the water-tank body B' of the traction-vehicle.

A steam-chest, C, cylinder D, crank-shaft H, &c., are supported by uprights I I, secured by brackets K K and bolts or rivets to the hot-air casing or shell B. Steam passes from the boiler to the steam-chest by a pipe, suitably arranged, as will readily be understood without detailed description and illustration.

The uprights I I are formed of tubular columns, securing the proper stiffness and strength with minimum weight and material. A cross-plate or broad bar, I', bolted to the lower ends of the columns, aids in bracing them, and the steam-cylinder D rests on this plate. Bearings $h\ h$ at the tops of the columns support the crank-shaft H, to which is jointed a suitable connecting-rod H'. A jointed valve-rod, G, guided beneath its joint in a lug, $g$, on one of the columns, extends from the steam-chest to its proper eccentric $h'$ on the crank-shaft. The cross-head G', to which the connecting-rod H' is jointed, and with which the piston-rod K' properly connects, is guided in adjustable ways formed by angular plates or brackets L L, secured by bolts $l\ l$ (two for each bracket) near their tops and bottoms to vertical ribs or projections $m\ m$, formed with or rigidly attached to the columns I I. (See Figs. 5 and 6.) The cross-head ends are tapered or inclined, and work in correspondingly-shaped or outward-flaring grooves in the heads or vertical edges of the brackets, opposite those edges by which they are adjustably bolted to the column-ribs. The bolt-holes of either the brackets L L or ribs $m\ m$ (in this instance the former) are slightly elongated horizontally or transversely of the brackets. Inclined edged or wedge-shaped rods M M (one for each bracket) occupy the spaces between the ribs $m\ m$ and the shoulders or back surfaces of the heads of the brackets. One edge only of each of the wedge-rods is inclined—that next the bracket-shoulder—and the bracket-shoulders are correspondingly inclined, as shown in Fig. 6. Nuts $m'\ m'$ are fitted to the upper reduced and threaded ends of the wedge-rods and bear on top of the column-ribs and brackets.

By the above-described construction it will be seen that the parts may be readily fitted and accurately adjusted.

When wear is to be compensated the bolts $l$ are loosened and one or both of the wedge-rods drawn up by turning the nut or nuts $m'$, thus causing the cross-head to enter farther into the guide groove or grooves.

Bands N N pass from the pulleys N' N' on the crank-shaft to the driven pulleys, in this instance those n n on a transverse shaft, O, mounted near the front of the water-tank base or body of the vehicle. This driven shaft O is mounted in brackets O' O', bolted to the wagon-body, and drives a longitudinal or counter-shaft, P, by a bevel-gear, o, with which the bevel-gear p of the shaft P meshes. At its rear end a worm, q, upon the shaft P, meshes with two gears, Q Q', the one above and the other below it.

The upper gear, Q, is mounted fast on a short shaft supported in glands, so as to turn in the walls of a tight casing, R, through which, near the bottom, the rear axle, R', of the wagon passes. Glands or packing around the axle prevent the escape of the oil with which the casing is filled to, or nearly to, its top opening. A hinged or removable cover is provided for the top of the oil-casing. The lower worm-gear is fast on the axle R'. Spur-pinions r r, meshing with each other, are fastened to the worm-gears or to their shafts and turn with them. The worm-shaft is mounted in a bracket-bearing, S, near its front, and at rear is supported by the bearing s in the oil casing or housing R.

The wheel T is fast on the axle R', and the wheel T' loosely mounted and connected with the axle by a backing-ratchet, t, for an obvious purpose.

The front supporting and steering wheels, U U, are loosely mounted on an axle fast to the lower end of a turning-post, U', mounted in a vertical sleeve or long bearing, V, formed with or rigidly attached to the arched frame or reach V' bolted to the body of the wagon.

A shaft, W, hand-wheel W', and worm on the shaft meshing with a worm-gear on the post U', serve to operate the steering-wheels in an obvious way.

I claim as of my own invention—

1. The combination of the boiler shell or casing, the columns or uprights at the side of or parallel therewith, the brackets by which the columns are secured at the side of said shell, the cross-plate connecting the columns at their lower ends, the steam-cylinder above and resting on said plate between the columns, the crank-shaft mounted in bearings at the tops of the columns, the connecting-rod, the piston-rod, and the cross-head guided in ways removably secured to the columns, all substantially as and for the purpose hereinbefore set forth.

2. The combination of the uprights or tubular columns having the ribs m m, the crank-shaft supported at the tops of the columns, the steam-cylinder supported between and above the lower ends of the columns, the piston-rod, the connecting rod, the inclined ended cross-head, and the brackets having the guide-grooves and adjustably bolted to the column-ribs, as and for the purpose set forth.

3. The combination of the uprights or columns I I, the ribs thereon, the angular plates or headed brackets having the inclined walled or flaring guide-grooves, the cross-head having inclined ends, the bolts adjustably connecting said brackets and ribs, and the adjustable wedge-shaped or inclined edged rods between the inclined rear surfaces or shoulders of the bracket-heads and the column-ribs, substantially as and for the purpose hereinbefore set forth.

4. The combination of the crank-shaft, the pulleys thereon, the transverse shaft, the brackets supporting it on the wagon-body, the longitudinal shaft geared with said transverse shaft, the worm on the longitudinal shaft, the worm-gears, the casing inclosing said gears, the spur-pinions, and the axle, substantially as and for the purpose hereinbefore set forth.

In testimony whereof I have hereunto subscribed my name.

AUSBERT H. WAGNER.

Witnesses:
 GEO. A. MILLIKEN,
 C. K. BILLINGS.